United States Patent [19]

Takei

[11] Patent Number: 5,565,718

[45] Date of Patent: Oct. 15, 1996

[54] DIRECT CURRENT LINEAR MOTOR AND A GUIDE UNIT ON WHICH IT IS EQUIPPED

[75] Inventor: Seiji Takei, Kanagawa-ken, Japan

[73] Assignee: Nippon Thompson Co., Ltd., Tokyo, Japan

[21] Appl. No.: 230,684

[22] Filed: Apr. 20, 1994

[30] Foreign Application Priority Data

Apr. 23, 1993 [JP] Japan .................................. 5-026819 U
Apr. 23, 1993 [JP] Japan ..................................... 5-120530

[51] Int. Cl.$^6$ ................................................. H02K 41/02
[52] U.S. Cl. .................................................... 310/12
[58] Field of Search ................................. 310/12, 13, 14; 318/135

[56] References Cited

U.S. PATENT DOCUMENTS 4,760,294  7/1988  Hansen ........................................ 310/13

Primary Examiner—Steven L. Stephan
Assistant Examiner—Judson H. Jones
Attorney, Agent, or Firm—Sughrue, Mion, Zinn, Macpeak & Seas

[57] ABSTRACT

A direct current linear motor and drive unit are described which, together with contributing to reduced size of the apparatus and so forth on which they are equipped, achieve reduction of costs.

These effects are achieved by separating at least one of each of the separate portions of a coil substrate and circuit substrate for at least two armature coils and its drive circuit each, and either connecting with a long, unseparated substrate or removing at least one of the separate portions to shorten said long substrate, thereby allowing an optimum stroke to be obtained which coincides with the operating stroke required by the apparatus and so forth on which it is to be equipped.

In addition, a direct current linear motor is described which achieves reduction of costs by reducing the number of parts.

This effect is achieved by providing a plurality of spacers for preventing deformation of a coil substrate caused by tightening force during fastening of that coil substrate, and forming each into a single unit.

11 Claims, 15 Drawing Sheets

5,565,718

DIRECT CURRENT LINEAR MOTOR AND A GUIDE UNIT ON WHICH IT IS EQUIPPED

BACKGROUND OF THE INVENTION

1. Field of the Invention

The present invention relates to a direct current linear motor commonly used for moving an object to be moved with high accuracy in, for example, a motion mechanism such as a machine tool or industrial robot, and a drive unit wherein a guiding device for guiding an object is added to said direct current linear motor.

2. Description of the Prior Art

An example of this type of direct current linear motor and drive unit of the prior art is shown in FIG. 1.

As shown in the drawing, this drive unit has a long base member 1 acting as a track rail, and a slider in the form of moving body 2 which moves along said base member 1. More specifically, a plurality of rollers (not shown) are provided in moving body 2, and these rollers roll over a track (not shown) formed along the lengthwise direction in base member 1.

Overhang 1a is formed on one side of base member 1, and a detected element in the form of linear scale 4 is provided on said overhang 1a roughly over its entire length. In contrast, small bracket 2a is provided on the side of moving body 2, and detection elements in the form of light emitting element 5a and light receiving element 5b are mounted on said small bracket 2a. A position detection device for detecting the position of moving body 2 with respect to a track rail in the form of base member 1 is composed by linear scale 4, light emitting element 5a and light receiving element 5b.

On the other hand, a direct current linear motor, which composes a drive unit together with the above-mentioned guide unit, is composed in the manner described below.

As shown in the drawing, said direct current linear motor is composed of a primary side equipped with a large number of armature coils 7, arranged on base member 1 in the lengthwise direction of said base member 1, and a secondary side having a field magnet (not shown) attached to the bottom surface of moving body 2 to oppose each of said armature coils 7. Each armature coil 7 is wound into the shape of a rectangular loop, attached to coil substrate 8, and fastened together with said coil substrate 8 to base member 1 by screws 9. In addition, the above-mentioned field magnet is magnetized by alternately arranging a plurality of N and S magnetic poles along the direction in which moving body 2 is to move, namely the lengthwise direction of base member 1.

In the drive unit having the constitution described above, by supplying a prescribed current to armature coils 7, thrust is produced based on Fleming's right hand rule between the primary and secondary sides. For example, if base member 1 to which the primary side is coupled, is taken to be the stationary side, moving body 2 integrated into a single unit with the secondary side is moved by this thrust. The position of moving body 2 with respect to base member 1 is then detected by the position detection device previously described.

Next, the following provides an explanation of a second example of a drive unit of the prior art based on FIG. 2. Furthermore, since this drive unit is composed in the same manner as the first example of a drive unit of the prior art shown in FIG. 1 with the exception of the following points, an explanation of the entire unit will be omitted, with the explanation only focusing on the essential portions.

As shown in the drawing, in said drive unit, each armature coil 7 is supported by a separate coil substrate 10, and the primary side is formed by linking these together.

In the case of fabricating various lengths of direct current linear motors and drive units in the constitution shown in the form of the first example of the prior art described above, since a long coil substrate 10 must be fabricated to match their entire lengths, a large mold and so forth is required for each type manufactured resulting in the disadvantage of high costs. In addition, in the case of attempting to incorporate said direct current linear motor and drive unit in an apparatus such as a machine tool, unless a direct current linear motor and drive unit is available that matches the operating stroke required by said apparatus, that having a stroke larger than said operating stroke must be selected, thus resulting in the disadvantage of not only excess costs, but also increased size of the apparatus.

On the other hand, in the constitution shown in FIG. 2 as a second example of the prior art, since coil substrate 10 is provided separately to correspond to each armature coil 7, at the time of assembly, assembly work is required involving coupling each armature coil 7 to each coil substrate 10, and then sequentially mounting these coupled assemblies in a row on base member 1. In said constitution, a direct current linear motor and drive unit of a desired stroke can be obtained by increasing or decreasing the number of individual coil substrates mentioned above linked together. However, since a large number of parts must be fabricated and manipulated in this manner, this constitution has the disadvantage of requiring numerous man-hours and having difficulty in reducing costs.

Continuing, the following provides an explanation of a drive unit containing a direct current linear motor as a third example of the prior art based on FIGS. 3 through 5. Furthermore, since this drive unit has a constitution similar to each of the drive units shown in FIGS. 1 and 2, with the exception of the following points, an explanation of the entire unit will be omitted, with the explanation only focusing on the essential portions.

As is clear from FIGS. 3 and 4, in said drive unit, each armature coil 7 and coil substrate 8 is fastened together to base member 1 to the outside of said coil substrate 8 by fastening members in the form of countersunk head screws 9 of which two each, for example, are inserted for each of said armature coils 7. Spacers 12 are inserted onto each of said countersunk head screws 9. These spacers 12 are for preventing warping and so forth of coil substrate 8 caused by fastening of countersunk head screws 9, and are formed into a circular shape as is clear from FIG. 5.

In a direct current linear motor containing the drive unit having the above-mentioned constitution, spacers 12 for preventing deformation of coil substrate 8 caused by tightening force during fastening of said coil substrate 8 are fit onto the end of each countersunk head screw 9. In said constitution, since a large number of parts including said spacers 12 have to be fabricated and manipulated, a large number of man-hours are required thus presenting a problem to be solved in terms of attempting to reduce production costs.

SUMMARY OF THE INVENTION

In consideration of the above-mentioned disadvantages of the prior art, a first object of the present invention is to provide a direct current linear motor and a drive unit which, together with contributing to reduced size of the apparatus and so forth in which it is to be incorporated, achieves reduction of costs.

In addition, a second object of the present invention is to provide a direct current linear motor which achieves reduction of costs by reducing the number of parts.

In order to achieve the above-mentioned first object, the present invention provides a direct current linear motor comprising: a primary side having a coil substrate supporting armature coils and a circuit substrate performing supply of electricity and so forth to said armature coils; and, a secondary side having a field magnet in which differing magnetic poles are alternately arranged and magnetized along the direction of relative movement with respect to said primary side; wherein, said armature coils and field magnet are arranged in opposition to each other, and said primary side arranges two or more armature coils provided on said coil substrate and a drive circuit provided on said circuit substrate in the form of individual units, a plurality of which are linked together into a single assembly, and allows said coil substrate and circuit substrate to be mutually divided by separating into said units of armature coils and drive circuit.

In addition, in order to achieve the above-mentioned first object of the present invention, the present invention provides a direct current linear motor comprising: a primary side having a coil substrate supporting armature coils and a circuit substrate performing supply of electricity and so forth to said armature coils; and, a secondary side having a field magnet in which differing magnetic poles are alternately arranged and magnetized along the direction of relative movement with respect to said primary side; wherein, said armature coils and field magnet are arranged in opposition to each other; and, a drive unit containing a guiding device which mutually guides said primary and secondary sides; wherein, said primary side arranges two or more armature coils provided on said coil substrate and a drive circuit provided on said circuit substrate in the form of individual units, a plurality of which are linked together into a single assembly, and allows said coil substrate and circuit substrate to be mutually divided by separating into said units of armature coils and drive circuit.

In addition, in order to achieve the above-mentioned second object of the present invention, the present invention provides that comprising: a primary side containing a coil substrate which supports armature coils; and, a secondary side having a field magnet in which differing magnetic poles are alternately arranged and magnetized along the direction of relative movement with respect to said primary side; wherein, said armature coils and field magnet are arranged in opposition to each other, spacers are arranged on each of said armature coils, fastening members are provided which fasten said coil substrate together with said armature coils and spacers, and said spacers are formed into a single unit with coupling portions extending between said spacers.

DESCRIPTION OF THE PREFERRED EMBODIMENTS

The following provides an explanation of the embodiments of the direct current linear motor and drive unit as claimed in the present invention with reference to the drawings. Furthermore, this direct current linear motor is of the moving magnet type.

The direct current linear motor as claimed in the present invention is composed of a primary side and secondary side. In the present embodiment, the primary side is explained in terms of the power supply side or stationary side, while the secondary side is explained in terms of the moving side.

To begin with, the following provides an explanation of the guiding device which performs mutual guidance of these primary and secondary sides.

Figure 1:
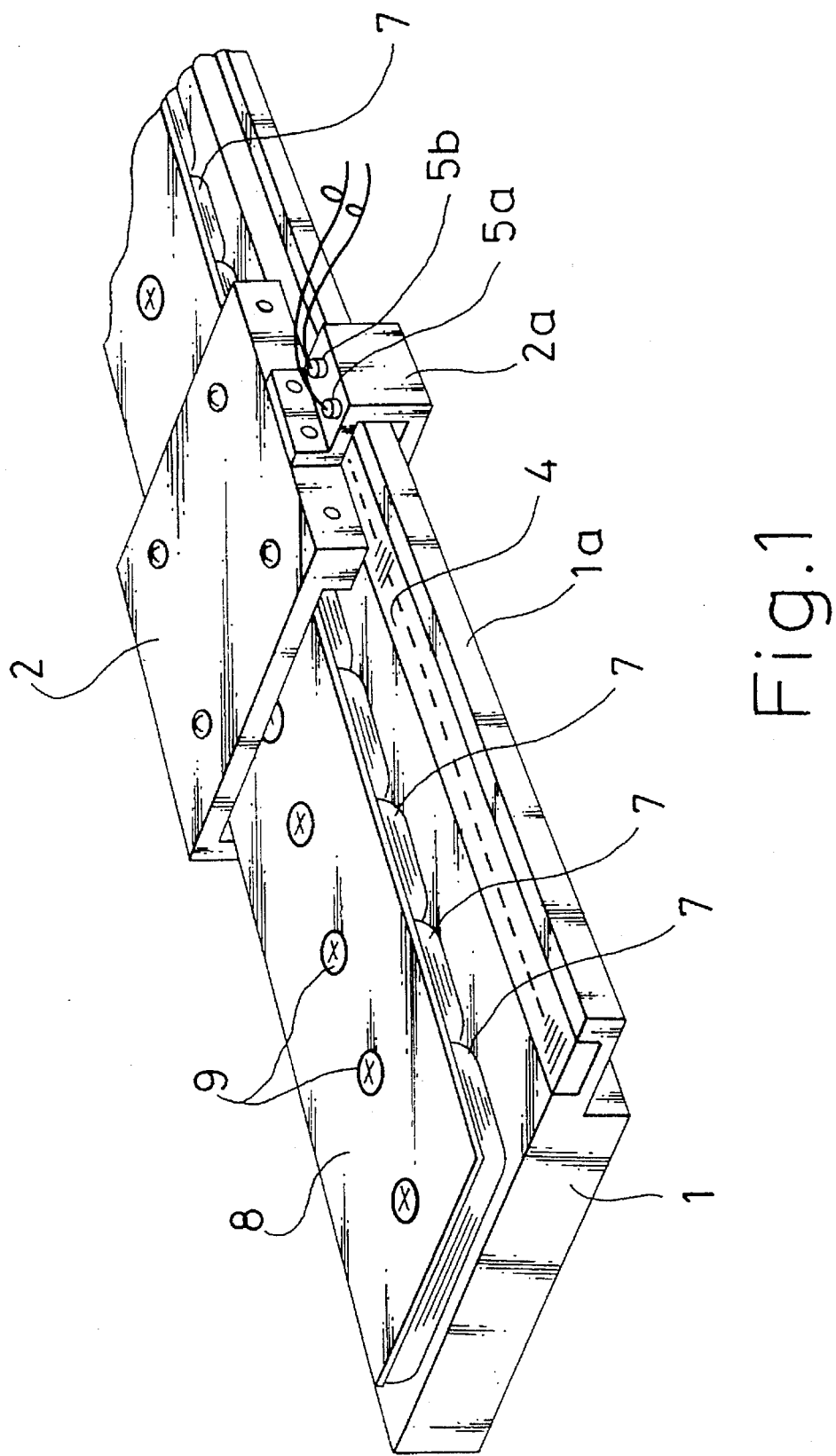
FIG. 1 is a perspective view of the essential portion of a drive unit of the prior art.
Figure 2:
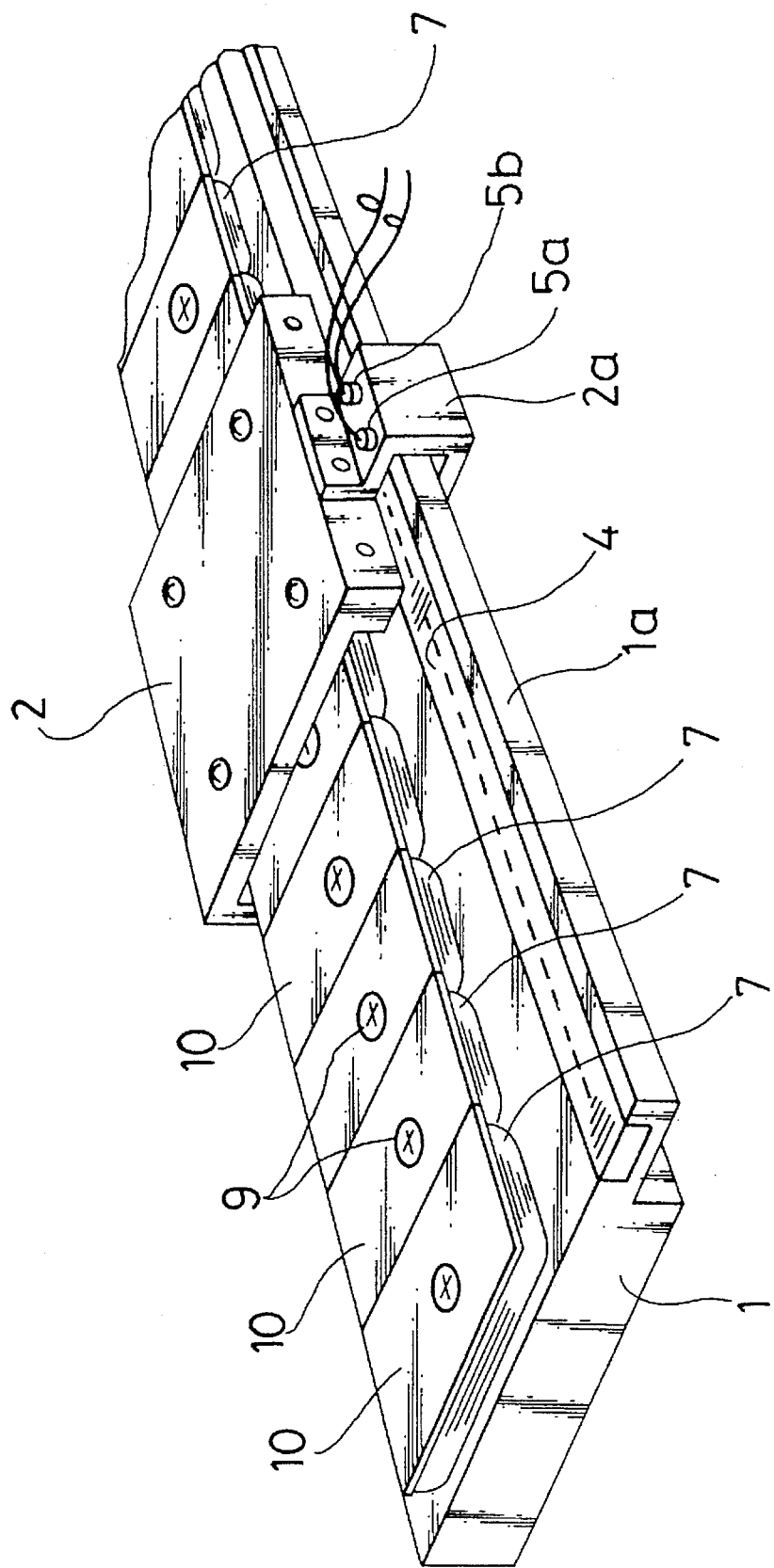
FIG. 2 is a perspective view of the essential portion of a second example of a drive unit of the prior art.
Figure 3:
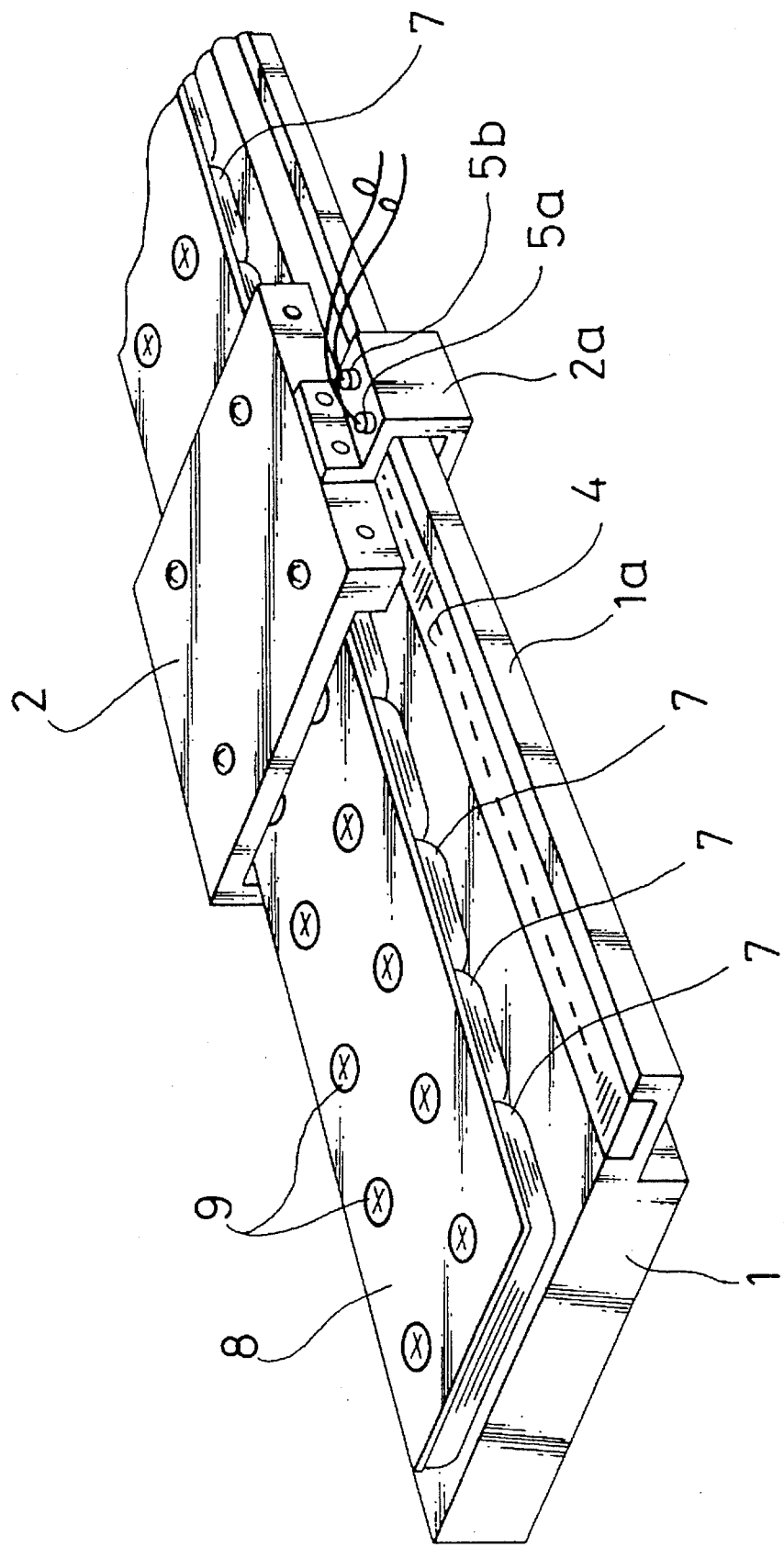
FIG. 3 is a perspective view of the essential portion of a drive unit containing a direct current linear motor as a third example of the prior art.
Figure 4:
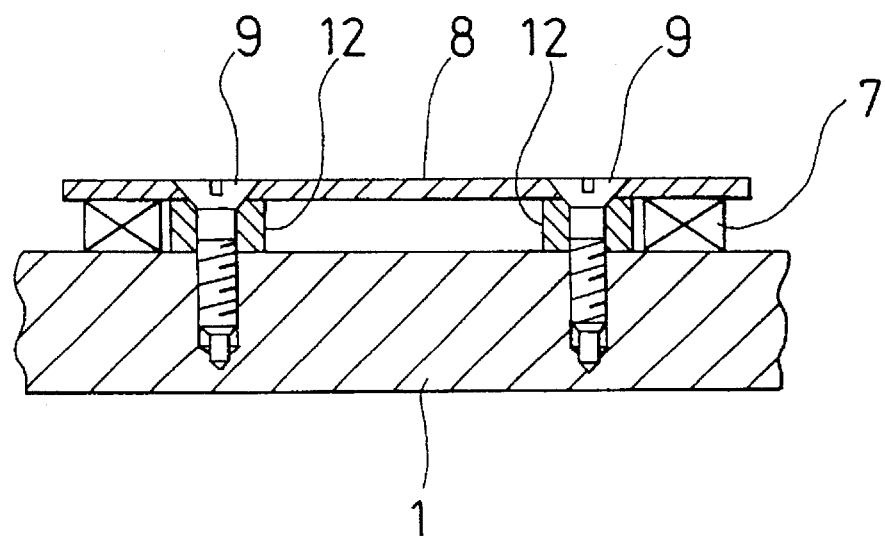
FIG. 4 is a vertical cross-sectional view of the essential portion of the drive unit shown in FIG. 3.
Figure 5:
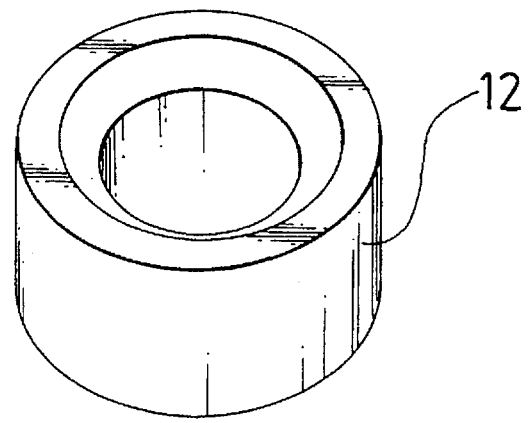
FIG. 5 is a perspective view of the spacer included in the constitution shown in FIG. 4.
Figure 6:
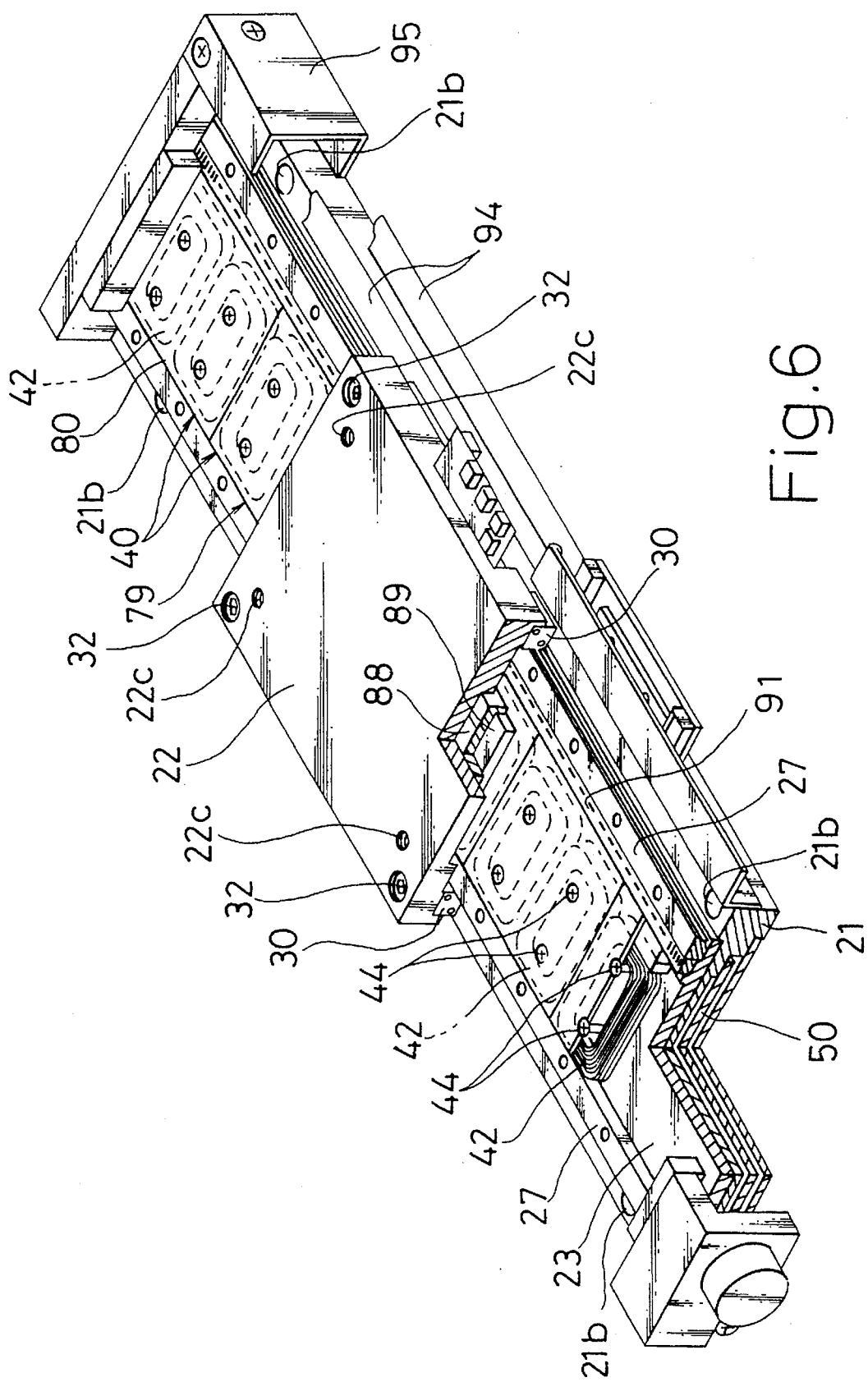
FIG. 6 is a perspective view including a partial cross-section of the drive unit as claimed in the present invention.
Figure 7:
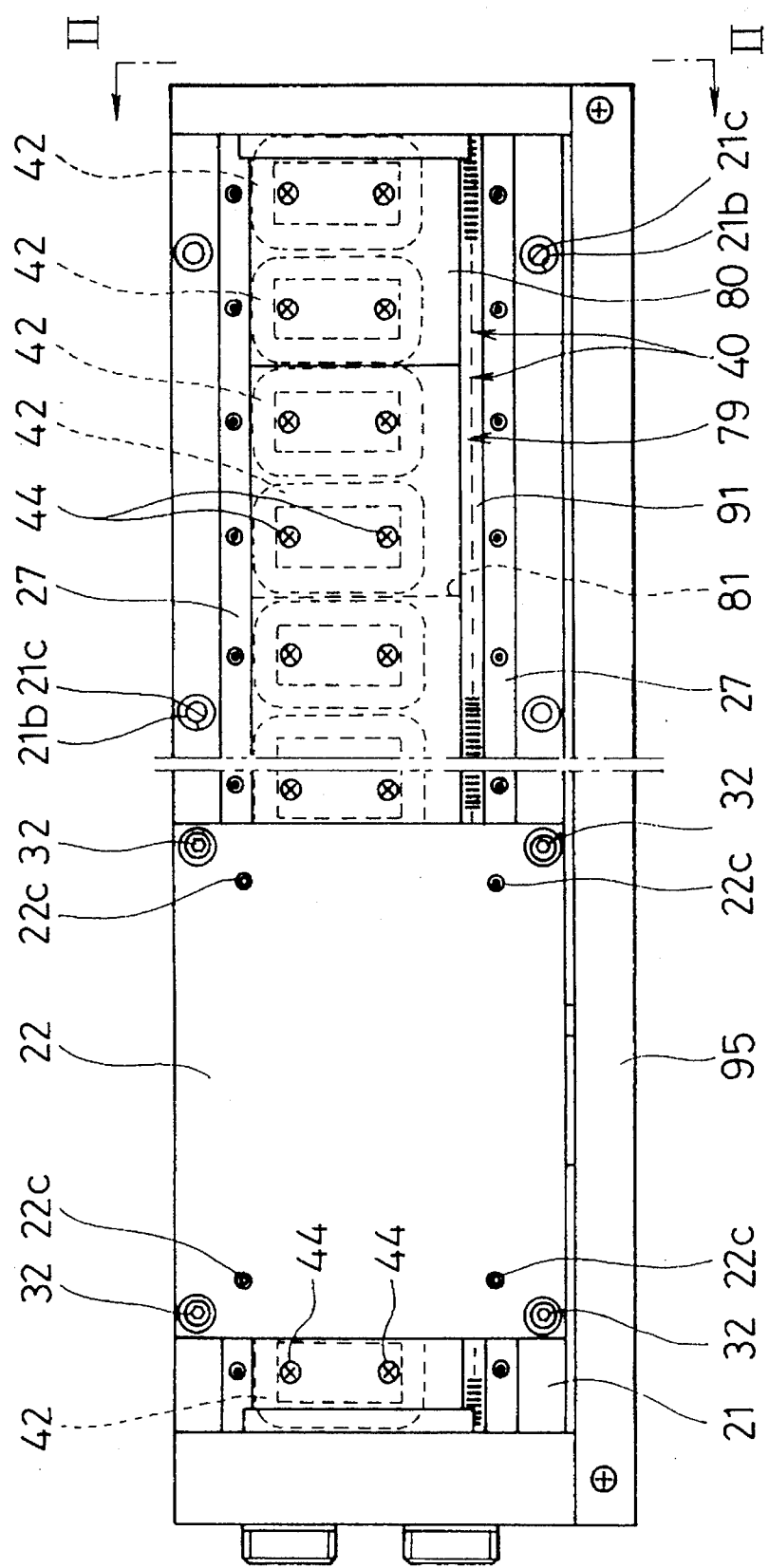
FIG. 7 is an overhead view of the drive unit shown in FIG. 6.
Figure 8:
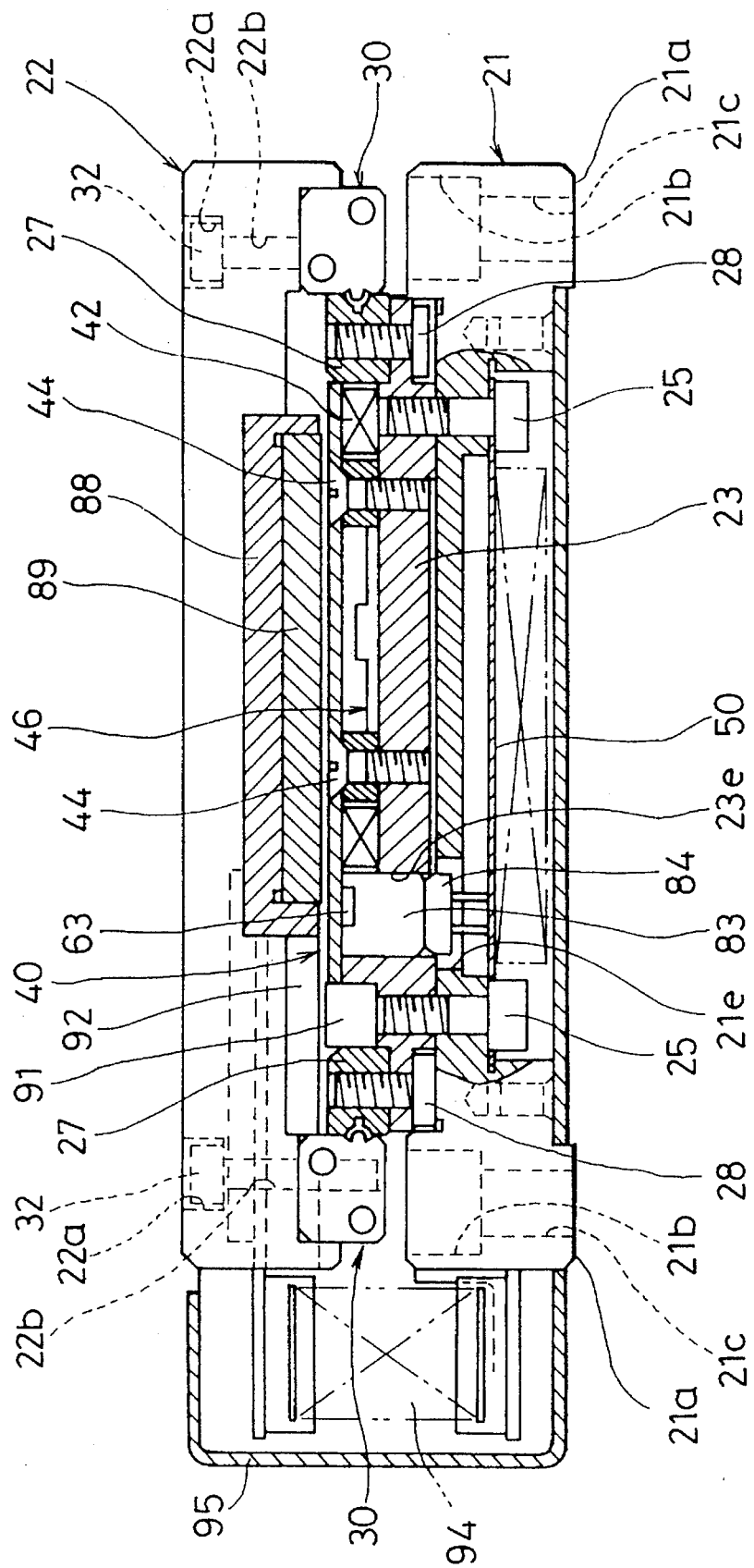
FIG. 8 is a view including a partial cross-section taken in the direction of arrows II—II with respect to FIG. 7.

As shown in FIGS. 6 through 8, this guiding device has a base member in the form of bed 21 formed roughly into the overall shape of, for example, a rectangle, and a moving object in the form of table 22 to move in the lengthwise direction of said bed 21. As shown in FIGS. 6 through 8, coil yoke 23, formed into roughly a rectangular shape and having nearly the same length as bed 21, is arranged on the upper surface of said bed 21, and is fastened to said bed 21 by a plurality of bolts (with hexagon sockets, see FIG. 8) 25.

Two track rails in the form of track rails 27 are arranged on both sides of the upper surface of said coil yoke 23 along the lengthwise direction of said coil yoke 23, and are fastened to said coil yoke 23 by a plurality of countersunk head screws 28 (see FIG. 8).

Figure 9:
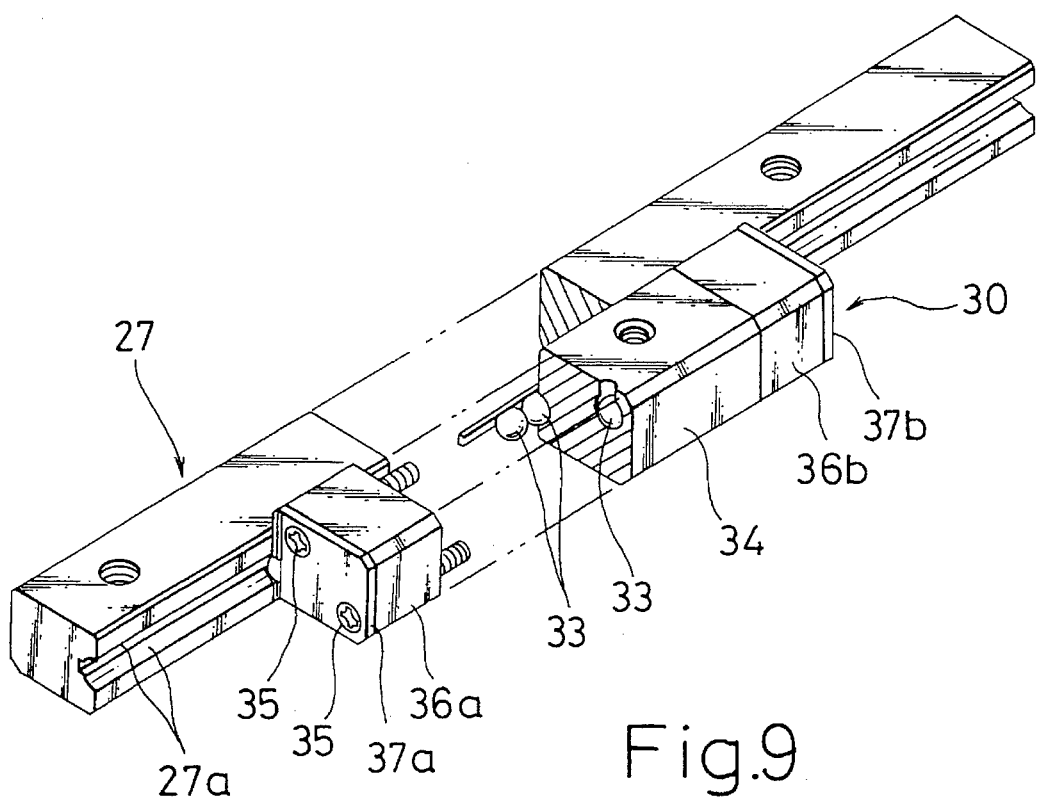
FIG. 9 is a perspective view including a partial cross-section of the track rail and slide member equipped on the drive unit shown in FIGS. 6 through 8.

As shown in FIG. 9, a track in the form of a single track groove 27a having a roughly semi-circular shaped cross-section is formed in the outside of the above-mentioned track rail 27. As is clear from FIGS. 6 and 8, a slider in the form of slide member 30, able to freely perform relative motion with respect to said track rail 27, is arranged on the outside of said track rail 27, and is fastened to the lower surface of table 22 by, for example, two bolts (with hexagon heads) 32. Furthermore, as shown in FIG. 8, countersunk portions 22a and insertion holes 22b are formed in table 22 into which the head portions and threaded portions, respectively, of bolts 32 are inserted. Bolts 32 are embedded in these countersunk portions 22a and insertion holes 22b, and do not protrude from the upper surface of table 22.

A rolling element circulating path (not shown) is formed in the above-mentioned slide member 30, and rolling elements in the form of a large number of balls 33 are arranged and contained within said rolling element circulating path. These balls 33 bear the load between track rail 27 and slide member 30 by circulating while rolling over track groove 27a of track rail 27 accompanying movement of slide member 30 with respect to track rail 27.

As shown in FIG. 9, the above-mentioned slide member 30 has casing 34, a pair of end caps 36a and 36b coupled to both ends of said casing 34 by countersunk head screws 35, and two seals 37a and 37b fastened to the outer surfaces of both of said end caps 36a and 36b. The above-mentioned rolling element circulating path is composed of a load bearing track groove and return path formed mutually in parallel and passing linearly through casing 34, and a pair of roughly arc-shaped direction changing paths formed in both end caps 36a and 36b which connect both ends of said load bearing track groove and return path. Furthermore, said load bearing track groove opposes track groove 27a of track rail 27.

The guiding device of the constitution described above is fastened to a flat mounting surface equipped on, for example, a machine tool (not shown) by a plurality of bolts (with hexagon sockets: not shown). Consequently, as shown in FIG. 8, bed 21 has flat mounting bottom surface 21a for anchoring said bed 21 to said mounting surface. As shown in FIGS. 6 through 8, countersunk portions 21b and insertion holes 21c are formed in both sides of bed 21 into which the head portions and threaded portions of the above-mentioned bolts for fastening said bed are respectively inserted. Said bolts are embedded in these countersunk portions 21b and insertion holes 21c, and do not protrude from the upper surface of bed 21. In addition, as shown in FIGS. 6 and 7, for example, four threaded holes 22c are formed in the four corners of the upper surface of table 22 able to move with respect to this bed 21, and a table (not shown) equipped on an apparatus on which said drive unit is equipped is fastened to said table 22 by bolts (not shown) screwed into these threaded holes 22c.

Continuing, the following provides a detailed description of the primary and secondary sides of the direct current linear motor which are mutually guided by the guiding device having the constitution described above.

Figure 10:
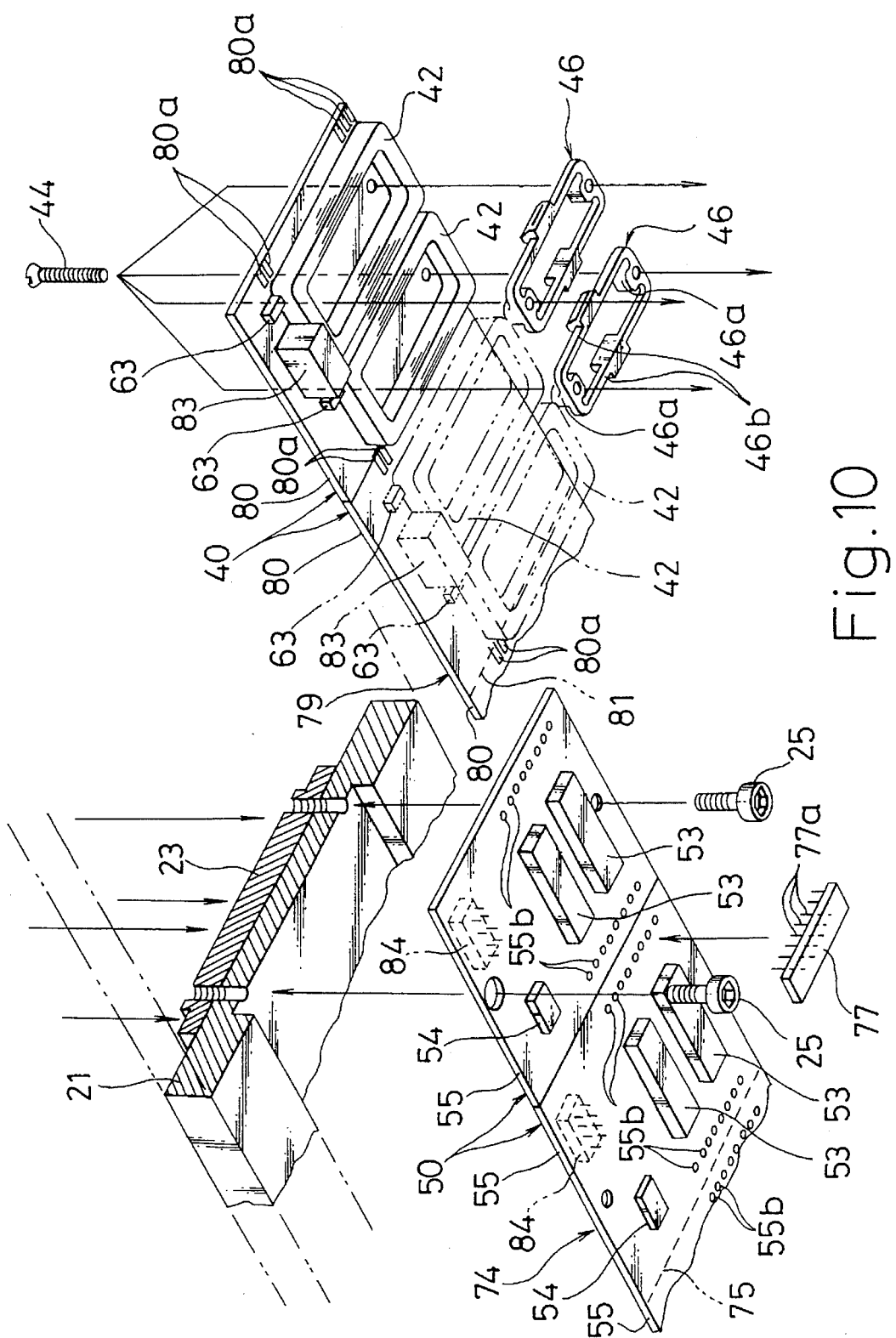
FIG. 10 is an exploded perspective view including a partial cross-section of the essential portion of the direct current linear motor included in the drive unit shown in FIGS. 6 through 8.
Figure 11:
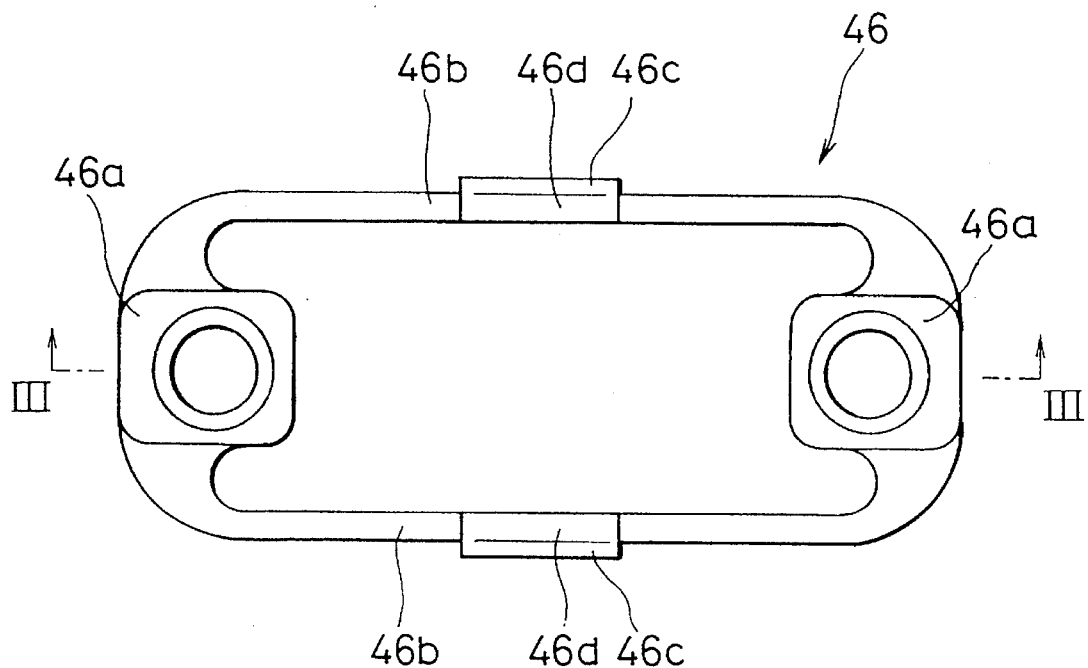
FIG. 11 is an overhead view of the spacer assembly included in the constitution shown in FIG. 10.
Figure 12:
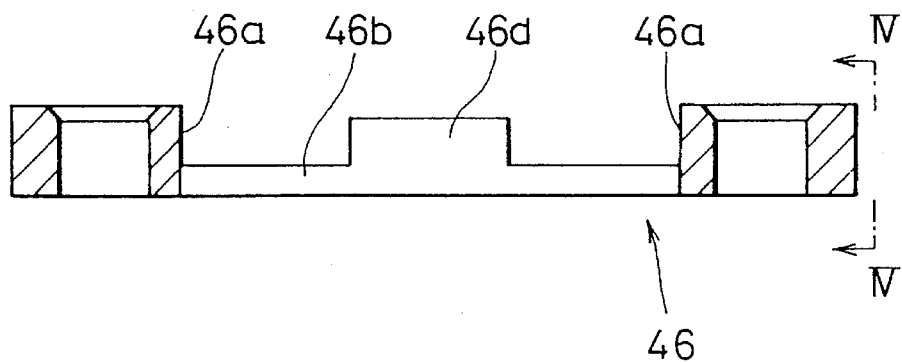
FIG. 12 is a cross-sectional view taken along arrows III—III with respect to FIG. 11.
Figure 13:
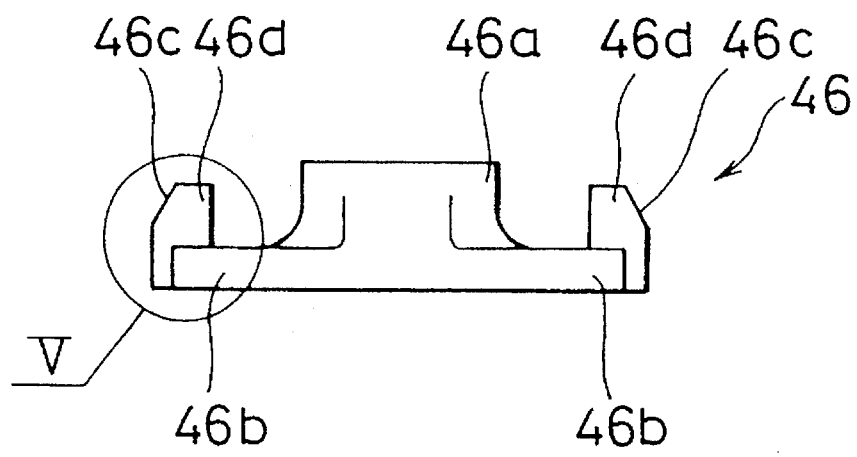
FIG. 13 is a view taken along arrows IV—IV with respect to FIG. 12.
Figure 14:
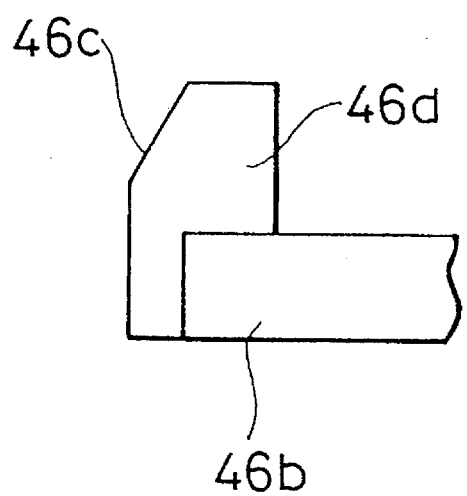
FIG. 14 is an enlarged view of portion V in FIG. 13.

To begin with, as shown in FIGS. 6 through 8 and 10, the primary side has the previously described coil yoke 23 installed on bed 21, coil substrate 40 arranged along the lengthwise direction of said coil yoke on the upper surface of said coil yoke 23, and, for example, 14 armature coils 42 supported by being affixed in a row in the direction in which the above-mentioned table 22 is to move on the lower surface of said coil substrate 40, namely the side of coil yoke 23. Furthermore, each armature coil 42 is wound into roughly the shape of a rectangular loop. In addition, as shown in FIGS. 8 and 10, Hall effect elements 63 are provided corresponding to each armature coil 42 on coil substrate 40.

Each of the above-mentioned armature coils 42 and coil substrate 40 are fastened together to coil yoke 23 to the outside of said coil substrate 40 by fastening members in the form of countersunk head screws 44, for example, two each of which are inserted for each of said armature coils 42.

As shown in FIGS. 8 and 10, spacer assemblies 46 are juxtaposed between coil substrate 40 fastened by countersunk head screws 44 and coil yoke 23 into which said countersunk head screws 44 are screwed. These spacer assemblies 46 are provided to prevent warping and so forth of coil substrate 40 caused by tightening of countersunk head screws 44, and are fit inside each armature coil 42.

The details of the above-mentioned spacer assemblies 46 are shown in FIGS. 11 through 14.

As shown in FIGS. 10 through 13, the above-mentioned spacer assemblies 26 have a pair of spacers 46a, each formed roughly into the shape of a square column, which are fit over each of the above-mentioned countersunk head screws 44 and which bear the tightening force produced by said countersunk head screws 44 between coil substrate 40 and coil yoke 23, and two long, narrow coupling portions 46b extending between both of said spacers 46a to connect said spacers together on the right and left sides of both of said spacers 46a. These spacers 46a and coupling members 46b are mutually molded into a single unit using, for example, a synthetic resin for the raw material. However, a constitution may also be employed wherein either spacers 46a or coupling portions 46b are molded with synthetic resin, while the other is formed with a metal such as steel, after which both are coupled into a single unit.

As explained above, since two spacers 46a are mutually formed into a single unit by coupling portions 46b, a worker or robot can easily manipulate both of said spacers 46a in a single operation such as during assembly or disassembly, thus reducing the number of man-hours required and achieving reduced costs. In addition, as explained above, since the entire spacer assembly 46 is formed into a single part by molding two spacers 46a and coupling portions 46b into a single unit using synthetic resin and so forth for the raw material, the number of parts can be held to a low number, thus achieving reductions in cost with respect to this point as well.

However, both coupling portions 46b provided between two spacers 46a have flexibility causing spacer assemblies 46 to be locked on the inside of armature coils 42 due to the resiliency of said coupling portions 46b during installation of said spacer assemblies 46. The following advantages are offered as a result of having said constitution.

Namely, when coil substrate 40 is fastened to coil yoke 23 by countersunk head screws 44, since each armature coil 42 is affixed to the lower surface of coil substrate 40 in advance as shown in FIG. 10, coil substrate 40 is placed on coil yoke 23 while attaching spacer assemblies 46 to the inside of these armature coils 42 and then fastening by screwing in countersunk head screws 44 while in this state. At this time, when spacer assemblies 46 are pushed inside armature coils 42, said spacer assemblies 46 are securely locked to said armature coils 42 due to the resiliency of the coupling portions 46b equipped in said spacer assemblies 46, thus facilitating assembly work since said spacer assemblies 46 do not fall out even if pushing force is removed.

Furthermore, as is clear from FIGS. 11 through 14, guide tabs 46d are provided projecting from the roughly central portion of coupling portions 46b possessed by the above-mentioned spacer assemblies 46 in which are formed tapered surfaces 46c. These guide tabs 46d perform the action of guiding said coupling portions 46b to the insides of armature coils 42 as a result of tapered surfaces 46c smoothly making contact with the inside edges of said armature coils 42 during insertion of said spacer assemblies 46 into said armature coils 42. As a result, greater facilitation of assembly work is achieved.

Next, the following provides an explanation of the circuit substrate for performing supply of electricity and so forth to each of the above-mentioned armature coils 42.

As shown in FIGS. 6, 8 and 10, circuit substrate 50 is arranged in parallel with coil substrate 40 on the lower surface of bed 21 on which said coil substrate 40 is installed on the upper surface with coil yoke 23 in between. Moreover, said circuit substrate 50 is fastened to said base member 21 by a plurality of bolts (with hexagon sockets) 25. Furthermore, these bolts 25 are fastened to bed 21 of the above-mentioned coil yoke 23.

As shown in FIG. 10, the above-mentioned circuit substrate 50 is composed of a plurality of separate portions 55 joined together, each provided with a drive circuit composed of electronic components 53, 54 and so forth. These separate portions 55 are provided corresponding to two armature coils each of the fourteen armature coils 42 provided in a row. Thus, the number of these separate portions 55, in this case, is seven.

The drive circuit provided on each of the above-mentioned separate portions 55 contains one set of circuit portions supplying excitation current to one armature coil, or in other words, a circuit corresponding to two armature coils.

Continuing, the following provides a detailed description of the separate constitution of the above-mentioned circuit substrate 50 and coil substrate 40 arranged above it.

To begin with, the following provides an explanation of circuit substrate 50.

Figure 15:
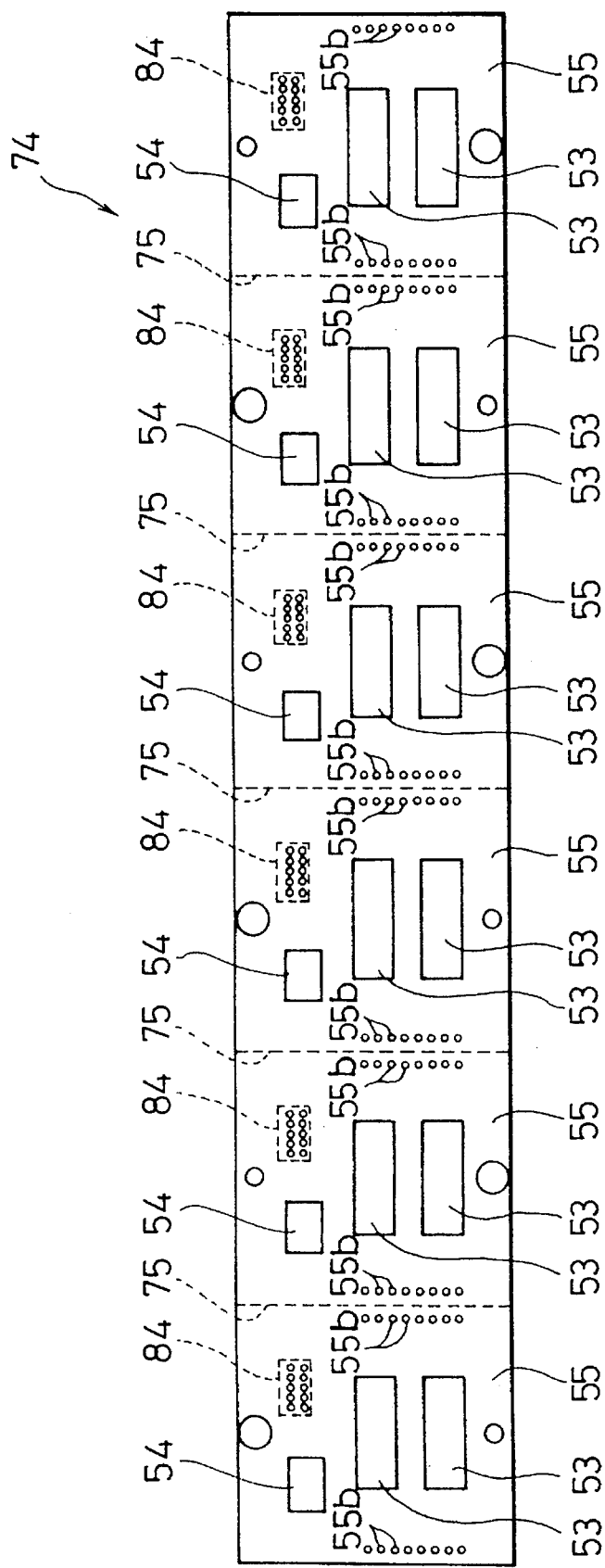
FIG. 15 is an overhead view of the base substrate to be incorporated in the drive unit shown in FIGS. 6 through 8.
Figure 16:
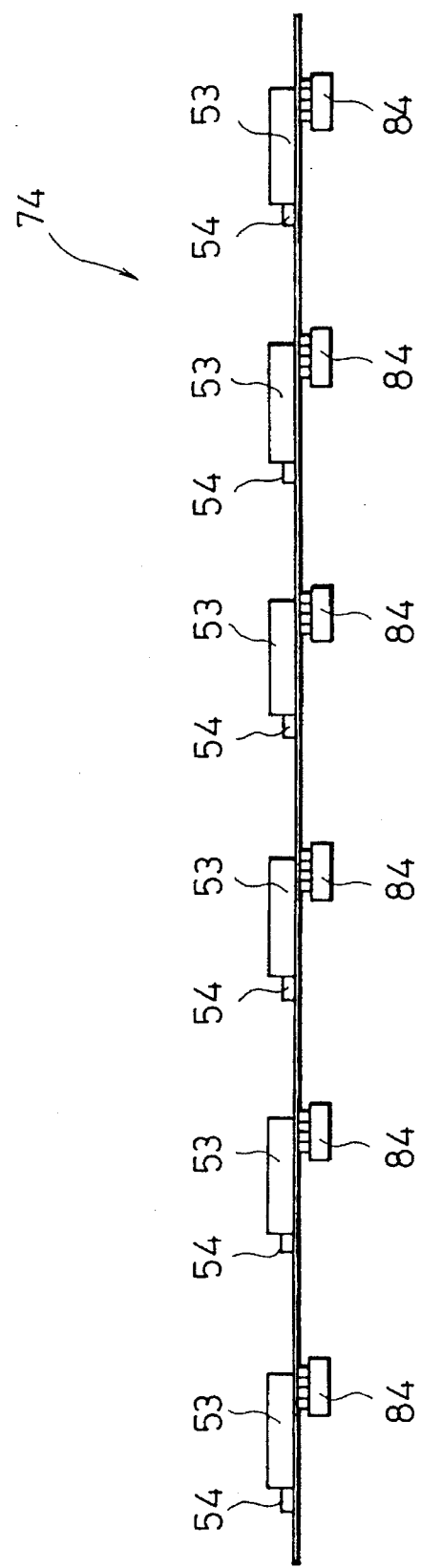
FIG. 16 is a front view of the base substrate shown in FIG. 15.
Figure 17:
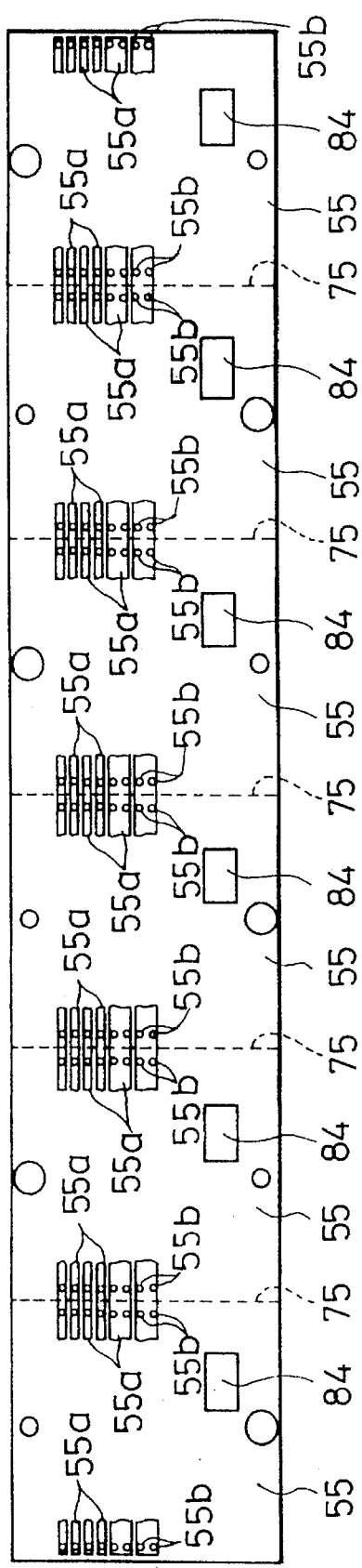
FIG. 17 is a bottom view of the base substrate shown in FIGS. 15 and 16.

In the case of fabricating this circuit substrate 50, a base substrate having the base length shown in FIGS. 15 through 17 is made available. As is clear from FIGS. 15 and 17, this base substrate 74 is composed of, for example, six separate portions 55 explained based on FIG. 10 joined into a single unit. As was previously described, these separate portions 55 are provided with a drive circuit that performs supply of electrical power and so forth to two armature coils each grouped in the form of individual units. Furthermore, as is shown in FIGS. 15 and 17, marks in the form of broken lines 75 are printed on both the upper and lower surfaces of base substrate 74 for distinguishing each of separate portions 55. In addition, as shown in FIG. 17, connection terminals 55a possessed by the drive circuit of each separate portion 55 are arranged on the end of each separate portion 55 in the direction of connection, and are connected between mutually adjacent separate portions 55, and more specifically, into a single unit over the above-mentioned broken line 75.

Since the previously described circuit substrate 50 must link together seven of the above-mentioned separate portions 55, said circuit substrate 50 is completed by severing one of the six separate portions 55 possessed by the above-mentioned base substrate 74 along broken line 75 to separate, arranging this separated separate portion 55 in a row at one end of unseparated base substrate 74 as shown in FIG. 10, and mutually connecting their corresponding connection terminals.

Furthermore, in FIG. 10, connection between the above-mentioned separate portions 55 and base substrate 74 is performed by a single connection component 77 having terminals 77a fit into through holes 55b (also shown in FIGS. 15 and 17) provided at the portion of both connection terminals 55a. Furthermore, although connection between corresponding connection terminals 55a may be performed using copper wire and so forth, by arranging connection terminals 55a of separate portions 55 on the ends in each connecting direction and performing connection using these connection components 77, in addition to connection of connection terminals 55a being able to be performed all at once, connections are reinforced due to the rigidity of said connection components 77. In addition, in addition to using components that simply act to make electrical connections, electronic components such as IC and so forth may also be used for connection components 77.

The following provides an explanation of coil substrate 40.

Although the overall coil substrate 40 is not shown, in the case of fabricating this coil substrate 40, a base substrate 79 of a length nearly equal to base substrate 74 for the above-mentioned circuit substrate 50 is made available as shown in FIG. 10. This base substrate 79 is composed by linking together six separate portions 80 into a single unit in the same manner as base substrate 74 for circuit substrate 50. As shown in the drawing, two armature coils 42 each are affixed grouped together in units on these six separate portions 80, thus making the total number of armature coils 42 arranged in a row on base substrate 79 twelve. Furthermore, as shown in FIGS. 10 and 7, marks in the form of broken lines 81 are printed on the upper surface of base substrate 79 to distinguish these separate portions 80. As shown in FIG. 10, circuit substrate 50 is formed by connecting while linking together a single separate portion 80 separated from another base substrate not shown to one end of this unseparated base substrate 79. Furthermore, in FIG. 10, reference numeral 80a indicate connection terminals provided on each of said separate portions 80.

However, in the description thus far, although two armature coils 42 each and a drive circuit for driving said armature coils 42 are separated into units with respect to coil substrate 40 and circuit substrate 50, three or more armature coils 42 and their drive circuit may also be separated into their respective units. In addition, although base substrate 74, which supports twelve armature coils, and base substrate 79, on which a plurality of drive circuits are arranged in a row corresponding to two of these armature coils 42 each, are made available during fabrication of the drive unit equipped with a total of fourteen armature coils in the present embodiment, it is only natural that the setting of the total length of these base substrates 74 and 79, namely the number of armature coils and drive circuits to be equipped on these, can be suitably changed.

In addition, although coil substrate 40 and circuit substrate 50 are composed by separating at least one of separate portions 55 and 80 provided on base substrate 74 and 79, and joining it to unseparated base substrates 74 and 79 in the present embodiment, in the case the operating stroke of the drive unit to be fabricated is shorter than the total length of base substrates 74 and 79, at least one of each of separate portions 55 and 80 provided on each of said base substrates 74 and 79 should be removed as necessary.

Furthermore, as shown in FIGS. 8, 10 and 15 through 17, coil substrate 40 and circuit substrate 50, which are arranged to be mutually separated by bed 21 and coil yoke 23, are connected by connecting, in this case, seven connection devices in the form of both corresponding male and female connectors 83 and 84 provided on mutually opposing sides of both said substrates. One each of these connectors 83 and 84 are arranged with respect to each of separate portions 55 and 80 each provided with two armature coils each and their drive circuit grouped into a unit as previously described. As shown in FIG. 8, said connectors 83 and 84 are mutually connected through apertures 21e and 23e formed in bed 21 and coil yoke 23. Thus, since one each of connectors 83 and 84 are provided for each of separate portions 55 and 80 of coil substrate 40 and circuit substrate 50, when mutually assembling both said separate portions 55 and 80, the directions of both can be recognized both quickly and easily, thus facilitating assembly work. Furthermore, connection of corresponding separate portions 55 and 80 may be by lead wires or by connectors as described above. In addition, besides providing only one connector for each of separate-:portions 55 and 80 as mentioned above, two or more connectors may also be provided.

On the other hand, the secondary side is composed in the manner described below.

Figure 18:
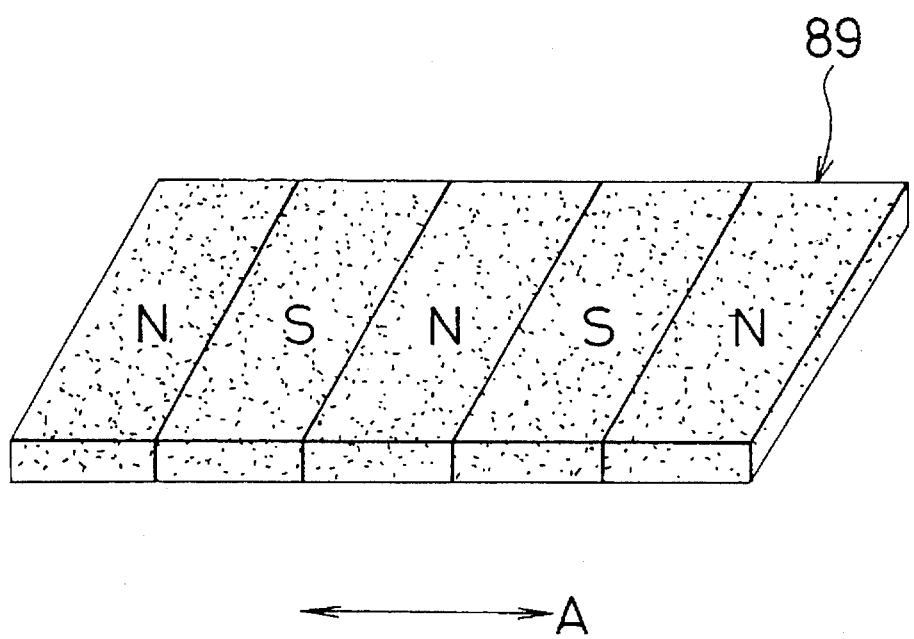
FIG. 18 is a perspective view of the field magnet which is a constituent member of the secondary side of the direct current linear motor included in the drive unit shown in FIGS. 6 through 8.

As shown in FIGS. 6 and 8, said secondary side has magnet yoke 88, mounted on the lower side of table 22, and field magnet 89 anchored on the lower surface of said magnet yoke 88 to oppose each of the above-mentioned armature coils 42 of the primary side. As shown in FIG. 18, the overall shape of field magnet 89 is formed into roughly that of a rectangular plate, and a plurality of N and S magnetic poles, for example 5, are magnetized so as to be alternately arranged in a row along direction A in which relative movement is performed by the primary and secondary sides, namely the lengthwise direction of bed 21.

In said drive unit, a detection device having the constitution described below is provided for detection of the relative positions; of the above-mentioned bed 21 and table 22.

Namely, said position detection device is composed of linear magnetic scale 91 shown in FIGS. 6 through 8, and magnetic sensor portion 92 shown in FIG. 8. Said linear magnetic scale 91 extends in the direction of movement of the above-mentioned table 22, and together with a large number of N and S magnetic poles alternately magnetized at a minute pitch along its lengthwise direction, an origin signal magnetized portion is formed at one end. Together with providing a Hall effect element for origin detection at magnetic sensor portion 92, another two A phase and B phase Hall effect elements are alternately arranged at said magnetic sensor portion 92 shifted by ½ the above-mentioned pitch. As a result of having said constitution, A phase and B phase signals are obtained thereby allowing detection of relative position along with assessment of direction of movement.

Furthermore, as is shown in FIGS. 6 through 8, cables 94 for obtaining signals from the above-mentioned magnetic sensor portion 92, and cover 95 which covers said cables 94, are provided. Said cables 94 consist of flexible substrates.

In the drive unit having the above-mentioned constitution, by supplying a prescribed current to armature coils 42, thrust is generated between the primary and secondary sides based on Fleming's right hand rule, and for example, if bed 21 to which the primary side is coupled is taken to be the stationary side, table 22 integrated into a single unit with the secondary side is moved by this thrust. Finally, the position of table 22 with respect to bed 21 is detected by the position detection device described above.

Furthermore, although that having a mechanical constitution is indicated for the guiding device which performs mutual guidance of the primary and secondary sides in the above-mentioned embodiment, this can also be a guiding device of a constitution wherein both members are relatively floated by the pressure of a fluid (air or oil) or the magnetic force of a magnet.

In addition, although a moving magnet type of direct current linear motor, wherein the armature coil 42 side is stationary and the magnet 89 side moves, is indicated in the above-mentioned present embodiment, the present invention can also be applied to a moving coil type of direct current linear motor.

Moreover, the present invention can also be applied in other embodiments wherein bed 21 has a certain curvature or in the case of performing curved motion.

As explained above, in the direct current linear motor and drive unit according to the present invention, by separating at least one of each of the separate portions of a coil substrate and circuit substrate for at least two armature coils and its drive circuit each, and either connecting with a long, unseparated substrate or removing at least one of the separate portions to shorten said long substrate, an optimum stroke can be obtained which coincides with the operating stroke required by the apparatus and so forth on which it is to be equipped, thus offering the advantage of contributing to reduced size and reduced cost of said apparatus and so forth.

In addition, in the direct current linear motor and drive unit according to the present invention, the number of parts that compose such is relatively low, thus offering the advantage of fewer manhours required for fabrication and thereby reducing costs with respect to this point as well.

In addition, in the direct current linear motor according to the present invention, since each spacer provided to prevent deformation of a coil substrate due to tightening force during fastening of said coil substrate is formed integrating into a single structure, the number of manhours required for part production and assembly is reduced thus offering the advantage of lower costs.

What is claimed is:

1. A linear drive motor comprising:

a primary side including a yoke to which a coil substrate supporting armature coils is attached;

a second side having a field magnet in which differing magnetic poles alternately arranged and magnetized along the direction of relative movement with respect to said primary side said armature coils and field magnet being arranged in opposition to each other;

fastening members for fastening said coil substrate to said armature coils; and a plurality of spacers juxtaposed between said yoke and said coil substrate to prevent warping of said coil substrate caused by tightening of said fastening member, said spacers forming a single unit with coupling portions extending between said spacers, wherein said coupling portions have flexibility and resiliency for securing said spacer assembly to said armature coils.

2. A linear drive motor comprising:

a primary side including a yoke to which a coil substrate supporting armature coils is attached;

a second side having a field magnet in which differing magnetic poles alternately arranged and magnetized along the direction of relative movement with respect to said primary side, said armature coils and field magnet being arranged in opposition to each other;

fastening members for fastening said coil substrate to said armature coils; and a plurality of spacers juxtaposed between said yoke and said coil substrate to prevent warping of said coil substrate caused by tightening of said fastening member, said spacers forming a single unit with coupling portions extending between said spacers, wherein guide tabs are formed on said coupling portions for guiding said coupling portions to the inside of said armature coils.

3. A linear drive motor, comprising:

a base unit;

a table;

guide means for allowing said table to slide along said base unit in a longitudinal direction of said base unit; and drive means for driving said table, said drive means including:

a field magnet secured to said table and having differing magnetic poles alternately arranged in said longitudinal direction; and a plurality of separable drive units secured to said base member and arranged in said longitudinal direction opposing said field magnet, each said drive unit including a drive circuit substrate having a drive circuit thereon and an opposing coil substrate having a pair of coils thereon, wherein the length of said linear motor can be changed by varying the number of said drive units secured to said base member.

4. The drive motor of claim 3, further comprising a single connection component for electrically interconnecting adjacent drive circuit substrates.

5. The drive motor of claim 3, further comprising connectors for electrically connecting said drive circuit substrate to said coil substrate.

6. The drive motor of claim 3, wherein said guiding means includes a track rail secured to said base unit, and a slider secured to said table for performing relative motion with respect to said track rail.

7. The drive motor of claim 3, further comprising:

a plurality of spacer assemblies having a pair of spacers and a coupling portion molded therebetween;

a plurality of fastening members for securing said coil substrate to a coil yoke; and said spacer assembly juxtaposing between said coil yoke and said coil substrate to prevent warping of said coil substrate caused by tightening of said fastening member.

8. The drive motor of claim 7, further comprising a plurality of guide tabs on each of said coupling portion for guiding said spacer assemblies into openings defined by said coils.

9. The drive motor of claim 3, wherein a plurality connection terminals provided for each of said coil and drive circuit substrates are arranged at each end of each of said coil and drive circuit substrates in a connection direction.

10. The drive motor of claim 3, wherein said plurality of separable drive units include a first set of said drive units and another drive unit which is separated from a second set of drive units and secured to said first set.

11. The drive motor of claim 3, wherein said plurality of separable drive units include a set of said drive units with at least one drive unit separated therefrom.

\* \* \* \* \*